(12) United States Patent
Regaard et al.

(10) Patent No.: US 11,440,141 B2
(45) Date of Patent: Sep. 13, 2022

(54) DEVICES AND METHODS FOR MONITORING, IN PARTICULAR FOR REGULATING, A CUTTING PROCESS

(71) Applicant: TRUMPF Werkzeugmaschinen GmbH + Co. KG, Ditzingen (DE)

(72) Inventors: Boris Regaard, Stuttgart (DE); David Schindhelm, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 416 days.

(21) Appl. No.: 16/545,273

(22) Filed: Aug. 20, 2019

(65) Prior Publication Data

US 2019/0375051 A1 Dec. 12, 2019

Related U.S. Application Data

(63) Continuation-in-part of application No. 15/067,316, filed on Mar. 11, 2016, now Pat. No. 10,427,242, which is a continuation of application No. PCT/EP2014/064478, filed on Jul. 7, 2014.

(30) Foreign Application Priority Data

Sep. 13, 2013 (DE) .......................... 102013218421.2

(51) Int. Cl.
*B23K 26/38* (2014.01)
(52) U.S. Cl.
CPC .................................. *B23K 26/38* (2013.01)
(58) Field of Classification Search
CPC .. B23K 26/032; B23K 26/0626; B23K 26/02; B23K 26/04; B23K 26/38
See application file for complete search history.

(56) References Cited

U.S. PATENT DOCUMENTS

| 5,589,090 | A | 12/1996 | Song |
| 6,621,047 | B2 | 9/2003 | Kessler et al. |
| 10,427,242 | B2 | 10/2019 | Regaard et al. |
| 2004/0026389 | A1* | 2/2004 | Kessler ............... B23K 26/032 |
| | | | 219/121.83 |

(Continued)

FOREIGN PATENT DOCUMENTS

| CN | 102066039 | 5/2011 |
| CN | 102947045 | 2/2013 |

(Continued)

OTHER PUBLICATIONS

International Search Report from corresponding PCT Application No. PCT/EP2014/064478, dated Jan. 28, 2015, 10 pages.

(Continued)

*Primary Examiner* — Brian W Jennison
(74) *Attorney, Agent, or Firm* — Fish & Richardson P.C.

(57) ABSTRACT

The invention relates to devices and methods for monitoring or regulating a cutting process on a workpiece. A focusing element focuses a high-energy beam onto the workpiece. An image capture apparatus captures a region at the workpiece to be monitored. The region includes an interaction region of the high-energy beam with the workpiece. An control apparatus determines at least one characteristic variable of the cutting process, in particular of a kerf formed during the cutting process, on the basis of the captured interaction region.

35 Claims, 3 Drawing Sheets

(56) References Cited

U.S. PATENT DOCUMENTS

| | | | |
|---|---|---|---|
| 2005/0029326 A1 | 2/2005 | Henrikson | |
| 2005/0252895 A1 | 11/2005 | Schuermann et al. | |
| 2011/0114610 A1 | 5/2011 | Szelagowski et al. | |
| 2011/0278277 A1* | 11/2011 | Stork Genannt Wersborg | B23K 26/04 219/209 |
| 2013/0068738 A1 | 3/2013 | Schurmann et al. | |
| 2013/0319980 A1* | 12/2013 | Hesse | B23K 26/38 219/121.62 |
| 2014/0362385 A1 | 12/2014 | Uennura | |

FOREIGN PATENT DOCUMENTS

| | | |
|---|---|---|
| DE | 102008030374 | 12/2009 |
| DE | 102008053397 | 12/2009 |
| DE | 102008060384 | 4/2010 |
| DE | 102011016519 | 10/2012 |
| DE | 102012001609 | 2/2013 |
| EP | 1886757 | 7/2009 |
| WO | WO 2011134805 | 11/2011 |
| WO | WO 2012107331 | 8/2012 |
| WO | WO 2012163545 | 12/2012 |
| WO | WO 2013053832 | 4/2013 |

OTHER PUBLICATIONS

Notification of transmittal of Translation of the International Preliminary Report on Patentability and Written Opinion of the International Search Authority for corresponding PCT Application No. PCT/EP2014/064478, dated Mar. 24, 2016, 32 pages.

Schneider, Frank, "Monitoring, Control, and Automation of High Speed Laser Culling of Metal Sheets {for the Electrical Industry)", Partial English Translation, Shaker Verlag, 2005.

* cited by examiner

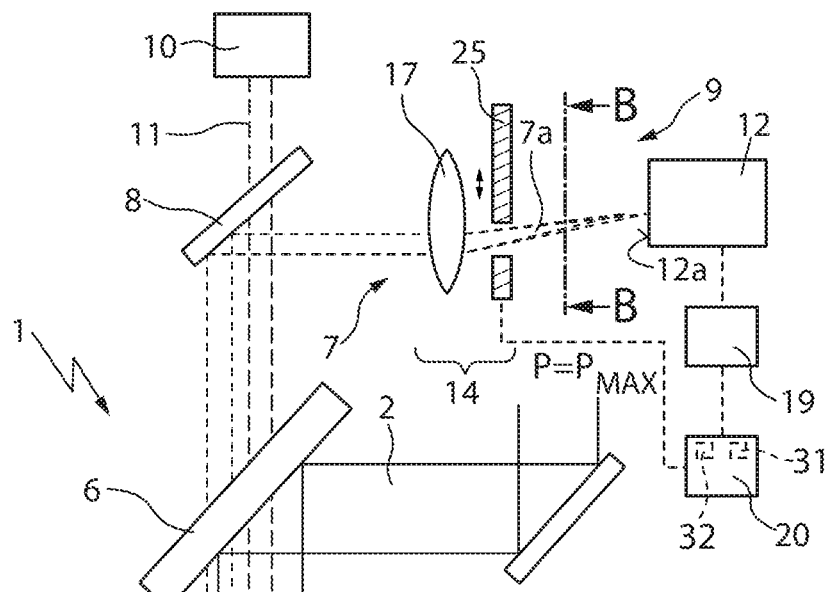
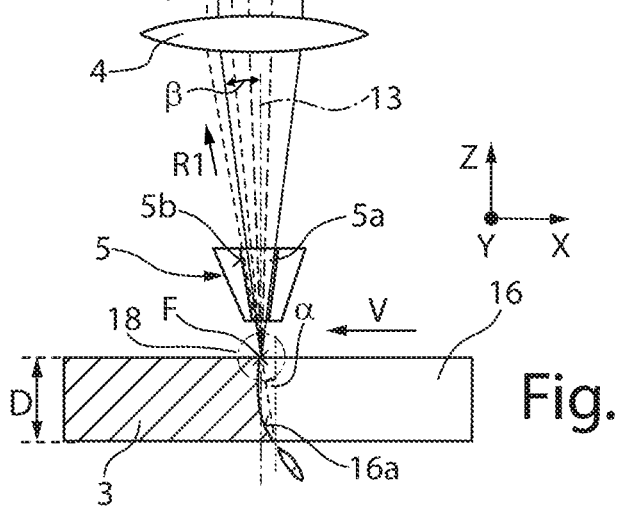 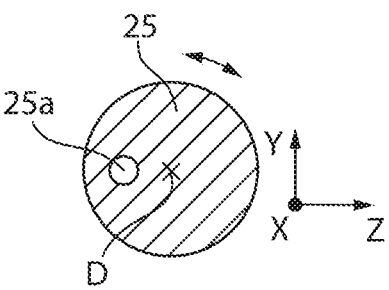
Fig. 1A  Fig. 1B
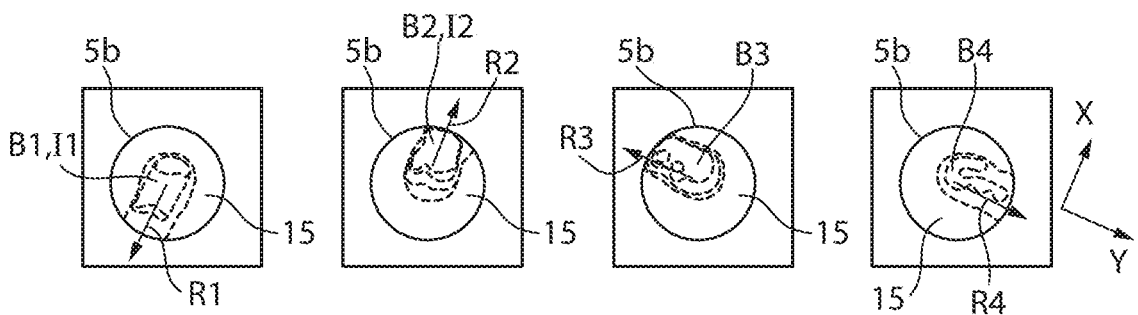
Fig. 2A  Fig. 2B  Fig. 2C  Fig. 2D

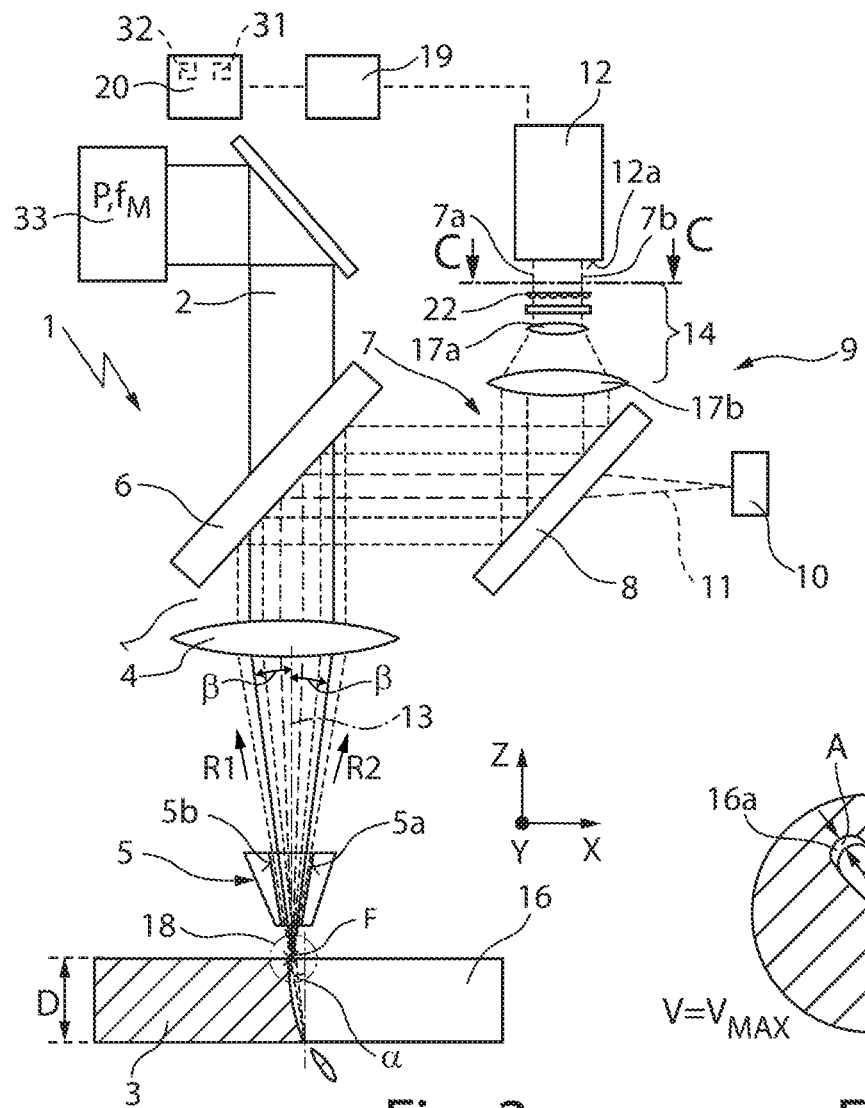
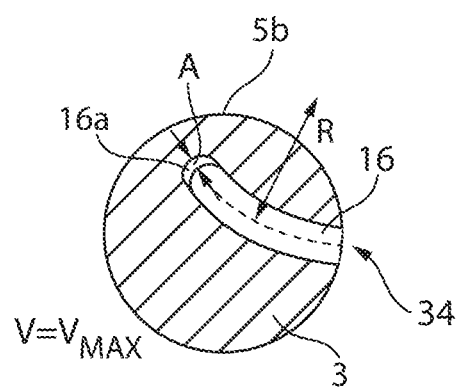
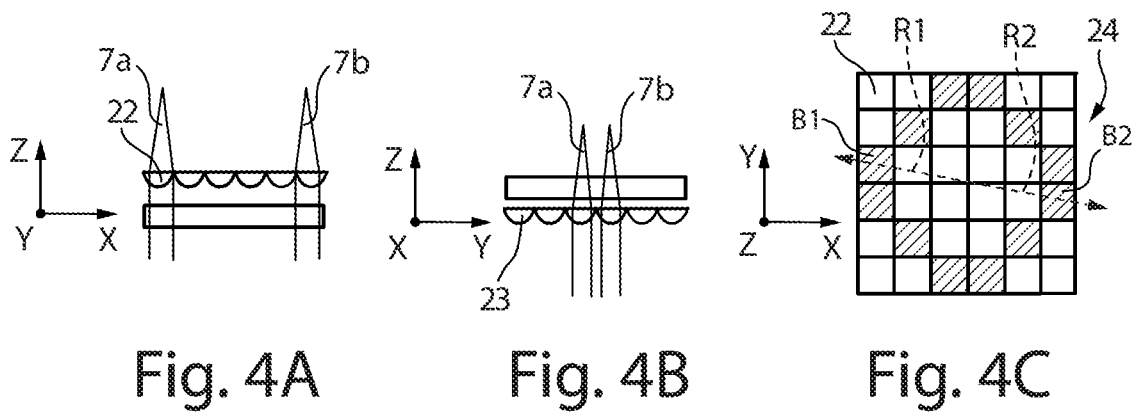
Fig. 3   Fig. 3A
Fig. 4A   Fig. 4B   Fig. 4C

DEVICES AND METHODS FOR MONITORING, IN PARTICULAR FOR REGULATING, A CUTTING PROCESS

CROSS-REFERENCE TO RELATED APPLICATIONS

This application is a continuation in part of and claims priority under 35 U.S.C. § 120 to U.S. application Ser. No. 15/067,316, filed on Mar. 11, 2016, which is a continuation of and claims priority to PCT Application No. PCT/EP2014/064478 filed on Jul. 7, 2014, which claims priority to German Application No. DE 102013218421.2, filed on Sep. 13, 2013. The contents of these priority applications are hereby incorporated by reference in their entireties.

TECHNICAL FIELD

The present invention relates to a device for monitoring, and in particular for regulating a cutting process on a workpiece.

BACKGROUND

International patent publication, WO 2012/107331 discloses a device for monitoring a laser cutting process which may serve for registering characteristic variables of a laser cutting process, for example an imminent loss of cut. WO 2012/107331 notes that an imminent loss of cut is identified when a predetermined gap width of the cut gap is undershot. Alternatively or additionally, the area of the observed cutting front is compared to a reference area that corresponds to the area of the cutting front in the case of a good cut or a quality cut. A loss of cut can also be detected if the radiation intensity emitted by the reference area exceeds a threshold for the target brightness in the case of a normal cut.

WO 2013/053832 A1 describes a device that measures backscattered light during a laser cutting process to verify the cut quality. The measured intensity of the backscattered light is lower if the cut extends through the workpiece. To optimize a removal of slag, a frequency or a pressure of gas pulses used during the cutting process are adapted by means of a control apparatus in such a way that the measured intensity of the backscattered light assumes a minimum value.

The general cause of a loss of cut lies in an insufficient energy influx into the workpiece. An energy input per unit length that is too low leads to flattening of the cutting front, i.e., to an increase in the cutting front angle. As a result of the increase in the cutting front angle, the molten material at the lower edge of the cut can no longer be completely driven away and the latter solidifies in the kerf. A closure of the cut lower edge leads to process irregularities that generally permanently prevent a severance cut. Therefore, the cutting front angle, which represents a characteristic variable of the cut gap, is an indicator for an imminent loss of cut.

In principle, the cutting front or the cutting front angle can be rendered measurable by a vertical observation of the temperature radiation emanating from the interaction region in a coaxial manner with the high-power beam. In the case of a known workpiece thickness, the cutting front angle can be deduced on the basis of the length of the emitting region in the kerf. A problem here is that a dripping melt filament below the workpiece leads to an elongation of the emitting region, and so it is not generally possible to measure the cutting front angle reliably in this manner.

WO 2012/107331 A1 proposes the detection of a cutting front upper edge and a cutting front lower edge as material boundaries of the workpiece and the determination of the cutting front angle of the laser cutting process therefrom, taking into account the thickness of the workpiece. To this end, the distance between the cutting front upper edge and the cutting front lower edge is typically measured along the gap center of the cut gap or kerf in the visible wavelength range. If the cutting front angle deviates from a setpoint value or setpoint range, this can indicate a cutting error or a non-ideal work point, which can be corrected by suitable measures, e.g., by adapting the cutting speed.

When observing the process coaxially through the cutting nozzle, a problem may arise in that the observation region is delimited by the generally circular inner contour of the cutting nozzle, both when observing the temperature radiation, the backscattered high-energy radiation and when observing material boundaries. In the case of flame cutting processes in particular, use is made of small nozzle diameters, and so the cutting front lower edge lies outside of the observation region restricted by the nozzle opening, even in the case of a good cut, and this can impede reliably determining the cutting front angle.

DE 10 2011 016 519 A1 describes a method and a device for controlling the processing of a workpiece by means of a high-energy processing beam, wherein the processing beam passes through a lens that can be moved perpendicular to the optical axis thereof in order to displace an impact point of the processing beam on the workpiece. In one example, provision is made of a monitoring camera for generating an electronically evaluable image, the imaging beam path of the camera is focused on the impact point by the lens.

WO 2012/107331 A1 also discloses the practice of deducing the presence or lack of a burr formation at the cut gap on the basis of the image of the interaction region. By way of example, by virtue of the lack of a recurring variation in the intensity of the thermal image in the region of the cut gap and/or in the case of an occurrence of three luminous strips emanating from the cutting front, it is possible to deduce the presence of a burr formation in the case of a fusion cutting process. In the case of a constructional steel flame-cutting process (using oxygen as cutting gas), periodically recurring grooves or furrows can be detected in the thermal image or in the visible wavelength range at the cut edges of the kerf and an imminent material burn-up can be deduced on the basis of the frequency of the furrows.

The theme of the dissertation "Überwachung, Regelung and Automatisierung beim Hochgeschwindigkeitsschneiden von Elektroblechen mit Laserstrahlen" by Frank Schneider, Shaker Verlag, 2005, is high-speed cutting with cutting or advance speeds of up to 100 m/min. In this application, a melt accumulation may form behind the cutting front and it may become so large in the case of a high speed that the capillary between the melt and the cutting front is temporarily closed off by the downward melt flow. In this case, the laser radiation is reflected back from the blocked capillary and measured by a pyro-detector or a thermopile with a dragging observation or an observation with a time lag. In the case of a dragging observation and high speeds, there are intense, short reflections and therefore a greatly fluctuating measured signal. Since the standard deviation of the measured signal typically increases with increasing speed, the high-speed cutting process can be regulated on the basis of the standard deviation.

SUMMARY

Various aspects of the invention relate to devices and associated methods for monitoring and/or regulating a cutting process. Such aspects enable a reliable determination of characteristic variables of the cutting process, in particular of characteristic variables of a kerf formed during the cutting process. Such aspects also enable an advantageous closed-loop control of the cutting process.

In some embodiments, the invention relates to devices for monitoring and/or regulating a cutting process on a work piece including a focusing element for focusing a high-energy beam onto the workpiece. The beam can be a laser beam. The devices also include an image capture apparatus for characterizing a region of the workpiece to be monitored. The region includes an interaction region of the high-energy beam with the workpiece. The devices can include an evaluation apparatus or control apparatus configured or programmed to determine at least one characteristic variable of the cutting process. The at least one characteristic variable can include a characteristic variable of a kerf formed during the cutting process on the basis of the captured interaction region.

In certain embodiments, the image capture apparatus is configured to form an observation beam for observing the interaction region from an observation direction extending at an angle to the beam direction of the high-energy beam. The image capture apparatus can include imaging optics for generating an image of the interaction region from the observation direction extending at the angle to the beam axis of the high-energy beam.

The measurement principle provided for determining the at least one characteristic variable is based on the registration of (at least) one image of the interaction region from (at least) one viewing angle or from at least one observation direction that extends at an angle (i.e. a non-zero angle) to the beam axis of the high-energy beam, i.e., the part of the observation beam path forming the observation beam extends at an angle to the optical axis of the focusing element and hence to the beam axis of the high-energy beam in the convergent beam path between the focusing element and workpiece. On the basis of such an observation beam, it is possible to determine characteristic variables of the cutting process, in particular of the kerf, in the case of a suitable evaluation of the captured image and, if necessary, it is possible to intervene in the cutting process in order to undertake an optimization in respect of the cutting quality.

The observation beam path extending coaxially with the beam axis of the high-energy beam extends in a manner parallel to the beam axis of the high-energy beam or concentric with the beam axis of the high-energy beam at the entry side of the focusing element. To generate or select a non-coaxial observation beam from the coaxial observation beam path, it is possible, for example, to provide a stop in the observation beam path. The imaging optics image on a detector surface the at least one, in particular exactly one, eccentric observation beam, i.e. an observation beam extending non-coaxially through the central axis of the focusing element and therefore extending at an angle to the workpiece or the beam axis of the high-energy beam in the convergent beam path between the focusing element and workpiece.

As a result of the observation at an angle to the beam axis, it is possible to determine characteristic variables, in particular properties of the kerf, which would not be identifiable in the case of a coaxial or perpendicular observation of the interaction region. Here, an observation beam extending at an angle to the beam axis is understood to mean a bundle of rays, in which the chief ray of the observation beam and the chief ray of the high-energy beam used for the processing deviate from one another by at least approximately 2° in the convergent beam path between the focusing element and the workpiece.

In certain embodiments, the image capture apparatus is configured to modify the alignment of the observation direction of the observation beam in a plane perpendicular to the beam axis of the high-energy beam. Typically, this plane extends parallel to the supporting plane or the surface of the generally plate-shaped workpiece. The current advance direction of the laser cutting process, i.e., the direction along which the high-energy beam and the workpiece are moved relative to one another along the supporting plane, depends on the contour to be cut in the workpiece. The current advance direction, and hence the direction in which the kerf extends, typically changes during the cutting process. To be able to continuously determine a specific characteristic variable during the cutting process, the alignment of the observation direction relative to the advance direction, i.e. relative to the direction along which the kerf is formed, should remain as constant as possible. This can be achieved by virtue of the image capture apparatus modifying the observation direction during the cutting process in a suitable manner. There are a number of options for modifying the alignment of the observation direction.

In some embodiments, the image capture apparatus has a stop for modifying the alignment of the observation direction of the observation beam. In this case, there can be imaging that is symmetrical in relation to the beam axis of the high-energy beam. An aperture through which the observation radiation passes in this case generates an observation beam that is assigned to the observation direction. In certain cases, the (mechanical) stop can be embodied as a rotatable (perforated) stop with an aperture arranged eccentrically in relation to the beam axis of the high-energy beam for the purposes of modifying the orientation or alignment of the observation beam. By way of example, such a perforated stop can be rotated at a constant angular speed and the respectively desired observation direction can be set by a synchronized recording time of the image capture apparatus. Alternatively or additionally, the (perforated) stop can have a displaceable embodiment in order to shadow a desired region of the observation beam path or to influence the alignment of the observation beam.

The stop can also be embodied as a switchable stop, for example in the form of an electronic shutter (e.g. of an LCD screen or of an LCOS display with switchable pixels, which respectively shadow a portion of the observation beam path) or in the form of a mechanical shutter that has a plurality of mechanically actuatable elements that can be switched between two switching states by means of a control apparatus in order to cover or open a portion of the observation beam path in each case. It is understood that further regions of the stop of the observation beam path can be opened or closed for the high-resolution observation of the region of the workpiece to be monitored with the goal of a process observation.

In a further embodiment, the imaging optics are configured to generate a plurality of images of the interaction region from differently aligned observation directions. In this case, a plurality of images of the interaction region can be recorded simultaneously and imaged on one or more detector surfaces. In this case, the control apparatus can evaluate only that portion or only those portions of the detector surface that correspond to a respectively desired observation direction, and so it is also possible in this case to modify the observation direction in a plane perpendicular to the beam axis by virtue of being able to switch between images recorded from different observation directions for the purposes of determining a characteristic variable of the cutting process.

Optionally, the imaging optics can also be configured to capture an image of the interaction region in an observation direction extending coaxially in relation to the beam axis of the high-energy beam, i.e. parallel to the beam axis of the high-energy beam (typically perpendicular to the workpiece plane), for example in order to detect material boundaries of the workpiece, e.g. the cut edges of the kerf. In particular, such an observation can be implemented with a high resolution.

In some implementations, the imaging optics have a plurality of imaging optical elements for generating the plurality of images of the interaction region from different observation directions. By way of example, the imaging optical elements can be spherical or aspherical lens elements. The lens elements can be arranged at a distance from one another that approximately corresponds to the distance between the images on the detector surface. Each one of the imaging optical elements in this case generates its own imaging or observation beam for generating the respectively associated image on an associated region of the detector surface. Typically, the lens elements are aligned off-center, i.e., not coaxially with the beam path of the high-energy beam or the extension thereof into the observation beam path, to enable the desired observation at an angle to the beam direction of the high-energy beam.

In some implementations, the imaging optical elements are arranged in a lens array or in a grid arrangement. A grid arrangement of lens elements ("lenslet" or lens array), e.g., of micro-lenses, can be realized in the form of lenses arranged in rows and columns, or else in the form of two crossed cylindrical lens arrays. In the latter case, in addition to cylindrical lenses of a first cylindrical lens array, which generate curvature or an imaging effect along a first axis, the imaging optics have a second cylindrical lens array that generates an imaging effect along a second axis that is perpendicular to the first. As a result of the crossed cylindrical lenses, it is possible, firstly, to produce the imaging optics in a cost-effective manner and, secondly, to use the available imaging cross section well.

To this end, in addition or as an alternative to the use of imaging optical elements for generating one or more images, the imaging optics can also include an apparatus for forming a respective observation beam by influencing a beam direction of an observation beam path.

By way of example, the apparatus can be embodied as a deflection apparatus with at least one beam deflection region associated with an observation direction. By way of example, in this case the incident observation radiation can be deflected by the deflection apparatus to one or more different regions of an imaging optical element, for example a lens element, in order to be focused on different, mutually spaced apart regions in the image plane thereof, in which the images of the interaction region are generated. By way of example, to this end, the deflection apparatus can have at least one deflection prism. As an alternative to the use of a deflection prism, the deflection apparatus can also be embodied in a reflecting manner and, for example, have a plurality of beam deflection regions in the form of mirror surfaces, which deflect the observation radiation in different directions, said directions being associated with a respective observation direction.

Alternatively or additionally, the imaging optics for generating one or more images can also include an apparatus that influences the beam direction of the observation beam path twice in an opposite manner for forming an observation beam, such that a beam offset emerges overall, i.e. the apparatus is a beam-offset apparatus. In particular, the beam-offset apparatus can be arranged in the focused observation beam path of the imaging optics, for example between two optical elements forming a beam telescope. The beam-offset apparatus can have, e.g., one, two, or more blocks made of a material transparent to illumination radiation, e.g., made of quartz glass, which are embodied as plane-parallel blocks or plates in order to determine a parallel offset of the incident observation radiation. The blocks can be arranged in a manner tilted with respect to one another so that the two or more observation beams are incident at different regions of the detector surface in order to generate two or more laterally offset images.

In a further embodiment, the device additionally comprises a control apparatus configured to modify the alignment of the observation direction in the plane perpendicular to the beam axis in a manner dependent on an advance direction of the cutting process. As described further herein, specific characteristic variables, e.g., the cutting front inclination, can only be determined under certain observation directions relative to the advance direction. For the purposes of controlling the observation direction, the control apparatus can actuate the image capture apparatus for changing the alignment of the observation direction and/or the control apparatus in such a way that the latter evaluates a suitable region of the detector surface associated with the desired observation direction.

In one development, the control apparatus is configured to keep the alignment of the observation direction constant relative to the advance direction of the cutting process. In this way, it is possible to reliably determine a specific characteristic variable, e.g. the cutting front angle, during the cutting process, even in the case where the advance direction changes during the cutting process.

In one embodiment, the observation direction extends counter to an advance direction of the cutting process in a plane perpendicular to the beam axis of the high-energy beam, more precisely in a projection in a plane perpendicular to the beam axis. In the case of such an observation counter to the cut direction of the cutting process, which is also referred to as dragging observation, the cutting front is covered by the upper edge of the cutting front in the case of a small enough cutting front angle; the kerf appears dark. If the cutting front inclination becomes flatter and the cutting front angle becomes larger, there no longer is a complete coverage; the kerf appears bright or bright in regions. Therefore, it is possible to draw conclusions about the cutting front angle as a characteristic variable of the cutting process from the brightness value or the measured overall intensity of the image, or of a portion of this image, recorded in the case of a dragging observation.

Within the scope of this application, an alignment counter to the advance direction of the cutting process is also understood to mean observation directions that deviate by less than approximately +/−23° from the alignment counter to the advance direction since the cutting front angle can still be determined, even in the case of such angular deviations.

In some implementations, the control apparatus is configured to determine a cutting front angle of the kerf and/or an overshoot and/or undershoot of a predetermined cutting front angle of the kerf as characteristic variable(s) of the cutting process on the basis of the registered interaction region. As illustrated herein, the length of the cutting front visible in this observation direction increases in the case of a flattening of the cutting front and so a measurement or determination of the cutting front inclination or of the cutting front angle is possible on the basis of an intensity value determined from the image captured during the dragging observation. The intensity value can be the overall intensity of the recorded image; however, in general only a spatially restricted portion of the recorded image in the region of the cutting front is evaluated for the purposes of determining the intensity value, i.e., the overall intensity in the spatially restricted portion is determined. In particular, it is possible to register or detect a critical value for the cutting front angle being exceeded by comparing this intensity value with an intensity reference value which, for example, corresponds to the overall intensity of a portion of the recorded image lying away from the cutting front.

Alternatively or additionally, it is also possible to register or detect when a critical value for the cutting front angle is undershot, for example if one of the above-described intensity values is undershot. As a result of this, it is possible, for example, to prevent burn-up during laser cutting with oxygen gas or imprecise contours in the case of laser fusion cutting with an inert gas, such as nitrogen, as a result of the introduction of too much energy. The invention increases the productivity of the cutting machine by virtue of the advance speed being correspondingly increased.

In further implementations, the angle at which the observation direction extends in relation to the beam axis of the high-energy beam deviates by less than 5°, preferably by less than 2° from the predetermined cutting front angle. It was found to be advantageous if the observation angle lies as close as possible to the cutting front angle for which, if the latter is exceeded, a good cut is no longer present, since, in this case, variations in the overall intensity of the captured image, or of a portion of the image in the region of the cutting front, are particularly strong or flickering of the captured image is observed. Such flickering can be traced back to small changes in the cutting front angle around the observation angle since the process luminescence is covered by the workpiece upper side in the case of temporarily slightly steeper cutting front angles yet said process luminescence can be captured by the detector in the case of flatter cutting front angles. If there is hardly any danger of a loss of cut, e.g. due to high laser power and low advance speed, it is possible, alternatively, to select the observation angle in such a way that undershooting a cutting front angle is registered by the detector by way of the flickering.

In a further embodiment, the angle from the observation beam to the beam axis of the high-energy beam lies between approximately 5° and 15°, preferably between approximately 5° and 10°. As illustrated further above, the angle at which the observation takes place should substantially correspond to the desired or predetermined cutting front angle, at which there still is a good cut. Cutting front angles at which a good cut occurs may lie within the interval specified above. Depending on the process or on the process parameters, e.g. on the advance speed and the workpiece material used, and depending on the beam geometry of the high-energy beam, the maximum possible cutting front angle for a good cut may possibly also lie outside this value range.

The observation under a desired (observation) angle of the observation beam in relation to the beam axis of the high-power beam can take place through the focusing element, provided that the required numerical aperture (NA) is provided. The numerical aperture NA is calculated directly from the desired observation angle as NA=n×sin(β), where n:=refractive index of the surrounding medium (generally air with n=1); β:=desired (maximum) observation angle. The numerical aperture of the image capture apparatus or of the imaging optics is selected in such a way that it allows an observation under the desired angle or within a desired angle range in relation to the beam axis.

In a further embodiment, the image capture apparatus is configured to form a further observation beam for observing the interaction region from a further observation direction and the imaging optics are configured to generate a further image of the interaction region from the further observation direction. Generating two or more images of the interaction region from two or more observation directions can be useful to determine different characteristic variables that can only be captured at all, or that can only be captured well, from a different observation direction in each case. It is also possible to undertake a comparison between two or more of the images recorded from different observation directions in order to be able to determine one and the same characteristic variable with greater precision or in order to be able to extract additional information by interrelating the image data or combining the image data by calculation.

In further embodiments, the control apparatus is configured to compare an intensity value determined from the further image of the interaction region with an intensity value determined from an image of the interaction region recorded counter to the advance direction in a plane perpendicular to the beam axis of the high-energy beam. In this case, the overall intensity of the image, or a portion of this image that, in particular, contains an image of the cutting front, which is captured in the dragging direction, i.e., against the advance direction, is compared with the overall intensity of a further image or a portion of this image, which is captured simultaneously from another observation direction, for the purposes of determining the cutting front inclination or the cutting front angle.

The intensity value determined from the further image serves as a reference value and can be compared with, for example, the intensity value determined from the image recorded counter to the cutting or advance direction, wherein either the overall intensity of the respective image or the overall intensity of portions positioned at the same location in the respective image is used for the comparison. The comparison can take place in different ways, for example by virtue of the two intensity values being subtracted from one another. The obtained difference can be compared to a threshold of the overall intensity in order to determine whether the cutting front angle overshoots or undershoots a predetermined value. In place of the difference, it is also possible to compare a different variable dependent on the two intensity values, e.g. the quotient, with a threshold in order to determine the cutting front angle or the overshoot or undershoot of a predetermined cutting front angle.

The observation direction from which the further image is recorded can be aligned, for example, in the advance direction, i.e. the image of the cutting front recorded in the dragging direction is compared to an image recorded in the pushing direction, wherein the observation regions include an angle of 180° to one another in the workpiece plane. However, a coaxial observation direction extending along the beam axis of the high-energy beam or, optionally, a different observation direction can also serve as reference for determining the cutting front angle. Moreover, a coaxial observation taking place along the beam axis of the high-energy beam can be used to enable a process observation of the region to be monitored with a higher resolution.

In further embodiments, the observation direction in a plane perpendicular to the beam axis of the high-energy beam is not aligned with, or counter to, the (current) advance direction of the cutting process and the control apparatus is configured to determine burr formation, roughness and/or furrow formation as characteristic variable(s) of the kerf on the basis of the recorded image. In this case, further characteristic variables of the kerf are determined, for example a furrow formation or a furrow distance in the cutting or advance direction and a furrow depth at the lateral edges of the kerf, a burr formation at the underside of the workpiece and/or the roughness at the cut gap flanks of the kerf, as an alternative or in addition to determining the cutting front inclination. The cutting front inclination, more precisely an overshoot of a predetermined cutting front angle, can form an indicator for a loss of cut or for a whisker or furrow formation (as preliminary stage of a loss of cut).

To this end, in particular, it is possible to select an observation direction or it is possible to select two observation directions aligned at an angle of approximately 180° in relation to one another, which directions extend at an angle of approximately +/−90° (typically between approximately +/−70° and +/−110° in relation to the advance direction in the projection on the workpiece plane, since the influence of one of the two lateral cut edges of the kerf on the interaction region is particularly well identifiable in each case from such observation directions, which simplifies the determination of the aforementioned characteristic variables.

In further embodiments, the device additionally comprises an illumination source for illuminating the workpiece in the region to be monitored. In particular, the illumination can be implemented coaxially in relation to the beam axis of the high-energy beam in order to make the upper edge of the workpiece or of the kerf visible and in order thus to simplify determining the position and direction of the kerf. By way of example, the illumination source can generate an illumination at wavelengths between 360 nm and 800 nm (VIS) or between approximately 800 nm and approximately 1000 nm (NIR). The illumination can be implemented coaxially with the high-energy radiation, i.e. in the form of reflected-light illumination. In this case, the illumination beam can be geometrically coupled into angular ranges, e.g., not used for the observation, for example in the form of a mirror or perforated mirror introduced into the collimated beam path, said mirror bringing together the beam paths for illumination and observation locally.

Alternatively, the illumination radiation can be coupled in by way of a beam splitter which, for example, reflects 50% of the illumination radiation and transmits 50% of the observation radiation. The beam splitter can also be embodied as a polarization beam splitter, and so only radiation whose polarization is rotated during reflection at the workpiece reaches into the observation beam path. However, it is also possible to align the illumination source in a non-coaxial manner in relation to the beam axis of the high-energy beam.

By way of example, the illumination source can be configured as a diode laser, a light-emitting diode (LED) or a flashlight lamp, wherein a large power density in a spectrally narrow region is advantageous for the illumination. To ensure homogeneous illumination, homogenization of the radiation, for example by a glass rod or a glass fiber, may be advantageous.

In further embodiments, the image capture apparatus is configured to record the image through a nozzle opening of a laser cutting nozzle for the passage of the laser beam to the workpiece. In this case, the ring-shaped inner edge of the nozzle opening of the laser cutting nozzle restricts the observation region or the region to be monitored that is registrable by means of the image capture apparatus. Optionally, there may also be a coaxial observation of the region to be monitored through the laser cutting nozzle in order to enable process observation with a higher resolution.

In other embodiments, the image capture apparatus includes a detector, in particular a camera, with a detector surface, at which the image is generated. The detector is generally a spatially resolving detector, for example a CCD sensor or a CMOS sensor, which can also be configured as an HDR (high dynamic range) sensor. One and the same detector surface of the camera can serve to capture a plurality of images, but it is also possible to provide a plurality of detectors or detector surfaces for capturing the images. The radiation that is emitted by the interaction region and used for the observation is thermal radiation in a wavelength range depending on the material of the workpiece.

In the case of workpieces containing iron, an observation in a wavelength range of between approximately 800 nm and 1100 nm or 1400 nm (NIR range) is typically advantageous. In the first case, use can be made of, for example, a Si-based camera; in the second case, use can be made of an InGaAs-based camera. In the case of non-ferrous metals, the melting temperature is lower, and so cameras that are sensitive to longer wavelengths, e.g., in the shortwave infrared range (SWIR) between approximately 1.4 µm and 3.0 µm (InGaAs) or possibly in the far infrared range (FIR) between approximately 15 µm and 1 mm, may be necessary or advantageous for the observation. In principle, a narrow-band observation in a wavelength range of approximately 15 nm or less is advantageous to prevent chromatic aberrations. To generate such a narrowband observation, provision can be made of a narrowband wavelength-selective filter in the image capture apparatus.

In further embodiments, the devices additionally can include an open-loop and/or closed-loop control apparatus for controlling and/or regulating parameters of the cutting process in a manner dependent on the at least one determined characteristic variable. The open-loop and/or closed-loop control apparatus typically serves to control or regulate the entire cutting process, i.e., the movement of the high-energy beam relative to the workpiece, required for the cutting process, and cutting parameters such as e.g. advance or cutting speed, process gas pressure, laser power, etc.

These and further parameters can be controlled or regulated in a manner dependent on the determined characteristic variable or variables. By way of example, depending on the determined cutting front angle, the advance speed can be reduced in a controlled or regulated manner in order to prevent a loss of cut. A reduction in the advance speed can be undertaken, for example, if the predetermined cutting front angle, at which a good cut still takes place, is exceeded.

A further aspect of the invention relates to devices of type described herein, which, in particular, may be embodied as described herein and in which the control apparatus is configured to determine a cutting front angle of the kerf and/or an overshoot of a predetermined cutting front angle and/or undershoot of a predetermined cutting front angle of the kerf as characteristic variable(s) of the cutting process on the basis of the captured interaction region. The devices additionally include a closed-loop control apparatus that is configured or programmed to regulate the cutting front angle to a predetermined constant value by influencing at least one manipulated parameter of the cutting process. The predetermined constant value of the cutting front angle typically corresponds to the predetermined cutting front angle provided that its overshoot or undershoot is determined.

The inventors have found that it is advantageous to use the three-dimensional form of the cut front, in particular the cutting front angle, as controlled variable for regulating the cutting process by means of a high-energy beam, in particular by means of a laser beam, i.e. to regulate the cutting front inclination or the cutting front angle to a predetermined constant setpoint value. To this end, the actual value of the cutting front angle and/or the overshoot and/or undershoot of the predetermined cutting front angle is determined, which can be implemented in the manner described further above. The current form of the cutting front or the current cutting front angle is therefore used as actual value for the closed-loop control. The energy input per unit length introduced into the workpiece is typically influenced as a manipulated variable in such a way that a constant setpoint geometry or a constant cutting front inclination sets in for a respective material type and material thickness of the workpiece.

It was found that the cutting front inclination or the cutting front angle correlates directly with the loss of cut limit and an ideal processing point, which can be kept just below the loss of cut limit, sets in in the case of a cutting front inclination adapted to the respective beam caustic of the high-energy beam. Different batches of the same material, which have different cutting inclinations and loss of cut limits for production reasons, each have the same cutting front inclination or the same form of the cutting front just below the individual loss of cut limit.

The manipulated parameters of the cutting process that can be influenced for regulating the cutting front angle are typically manipulated parameters that influence the energy input per unit length introduced into the workpiece. The energy input per unit length corresponds to the energy per unit length (e.g. cm) as introduced by the high-energy beam along the kerf. The manipulated parameters can be, inter alia, the advance speed between the high-energy beam and the workpiece, the power of the high-energy beam, the beam caustic or the focal position of the high-energy beam and the gas mixture and the gas supply (i.e., for example, the volumetric flow) of the cutting gas used during the cutting process.

In certain embodiments, the closed-loop control apparatuses are configured to select the manipulated parameter for regulating the cutting front angle in a manner dependent on the contour to be cut, in particular in a manner dependent on a radius of curvature of the contour to be cut. It was found that the selection of the manipulated parameter for regulating the cutting front angle to the constant setpoint value depends on the geometry of the contour to be cut, in particular on the radius of curvature thereof, since the advance speed is restricted by the dynamics of the axes involved in the movement in the case of a correspondingly small radius of curvature or when cutting a comparatively small contour. In this case, it is advantageous to use a different manipulated parameter, e.g. the power of the high-energy beam, rather than the advance speed for regulating the cutting process. However, the advance speed can be used as a manipulated variable if the power of the high-energy beam reaches the maximum value thereof, which is typically the case when cutting relatively long straight contours (with an infinitely large radius of curvature).

In other embodiments, the closed-loop control apparatus is configured to influence the advance speed between the high-energy beam and the workpiece as a manipulated parameter for regulating the cutting front angle if the advance speed is restricted to a maximum value by the material and the thickness of the workpiece—and not by the geometry of a contour to be cut into the workpiece. The maximum advance speed is typically achieved when cutting a (long) straight contour, i.e. in the case of a kerf extending along a straight line. The maximum advance speed is not restricted in this case by the dynamics of the axes involved in the movement, but by the type and the thickness of the cut workpiece material since a loss of cut occurs sooner or later if the maximum advance speed is exceeded. By using the advance speed as a manipulated variable, it is possible to adapt the advance speed in such a way that the desired constant cutting front angle is achieved and a loss of cut is prevented.

In some implementations, the closed-loop control apparatus is configured to keep the power of the high-energy beam at a constant, in particular maximum value while influencing the advance speed. The productivity of the cutting process can be increased if the power of the high-energy beam, for example of the laser beam, is kept at a constant value when cutting contours in which the dynamics of the axes involved in the movement do not impose an upward limit on the advance speed. In particular, the constant value is a maximum value for the respective device (e.g. laser cutting machine) and for the respective type and thickness of the workpiece material, which maximum value, for many materials, corresponds to the maximum possible power of the beam source, e.g. a laser source, which generates the high-energy beam. In this way, the energy input per unit length introduced into the workpiece can be maximized.

In further embodiments, the closed-loop control apparatus is configured to influence the power of the high-energy beam as a manipulated parameter for regulating the cutting front angle if the advance speed between the high-energy beam and the workpiece is restricted to a maximum value by the geometry of a contour to be cut into the workpiece. Unlike in the embodiment described above, the maximum advance speed is restricted in this case by the dynamics of the axes involved in the movement between the high-energy beam and the workpiece, which axes must enable tracing of the contour to be cut with the desired accuracy. In this case, it is advantageous to use not the advance speed but the power of the high-energy beam as a manipulated variable for regulating the cutting front angle since the process capability of the cutting process can be increased in this manner.

To carry out the cutting process with the maximum possible speed, the closed-loop control apparatus can be configured to keep the advance speed at the maximum possible value for cutting the contour while influencing the power of the high-energy beam. The maximum possible value of the advance speed can vary along the contour to be cut.

In some implementations, the closed-loop control apparatus is configured to modulate the power of the high-energy beam and influence the modulation of the power of the high-energy beam as a manipulated parameter for regulating the cutting front angle. The high-energy beam is typically used in the so-called "continuous wave" operation, in which the power is generated continuously and the amplitude of the power is reduced or increased. When cutting very small contours (with very small radii of curvature) in particular, it is possible to optimize the cut quality and the process capability by virtue of modulating the power, i.e., the high-energy beam not being turned-on permanently. By way of example, the power can be generated in a pulsed manner in this case and the power modulation can be used as a manipulated variable for regulating the cutting front angle.

In further embodiments, the control apparatus is configured to determine an overshoot of the predetermined cutting front angle of the kerf and the closed-loop control apparatus for regulating the cutting front angle has a discontinuous-action controller, in particular a two-position controller or a three-position controller. As was described further above, the control apparatus can be configured to detect an overshoot and/or an undershoot of a predetermined cutting front angle rather than to measure the magnitude of the cutting front angle in absolute terms.

In this case, a discontinuous-action controller, for example in the form of a two-position controller or a three-position controller, is advantageous for the closed-loop control. In particular, the closed-loop control can also be implemented in the case of the two-point measurement or in the case of a two-position controller by virtue of the cutting front oscillating about the setpoint value of the cutting front angle. Since the cutting process progresses dynamically, the cutting front angle is never absolutely constant. However, oscillating about the predetermined constant cutting front angle is measurable in the manner described further above. Optionally, the oscillation frequency can also be taken into account when regulating the cutting front angle. Moreover, "waves" extend over the cutting front, the presence of which may form a criterion for a well-set energy input per unit length or a good cut.

In further embodiments, the control apparatus is configured to determine the cutting front angle of the kerf and the closed-loop control apparatus for regulating the cutting front angle has a continuous-action (e.g. linear) controller, in particular a PID controller. As described above, it is also possible to determine the absolute value of the cutting front angle. In this case, it is advantageous if a continuous-action controller, for example a PID controller, is used for the closed-loop control. The implementation of more complex closed-loop control concepts is also possible.

In another aspect, the invention relates to methods for monitoring and/or regulating a cutting process on a workpiece. The methods include focusing a high-energy beam, such as a laser beam, onto the workpiece. The methods include characterizing a region of the workpiece to be monitored. The characterized region includes an interaction region of the high-energy beam with the workpiece, which interaction region can be characterized via an observation beam path extending substantially coaxially with the beam axis of the high-energy beam, and determining at least one characteristic variable of the cutting process, in particular of a kerf formed during the cutting process, on the basis of the captured interaction region. The region of the workpiece to be monitored is preferably captured by an observation beam path extending substantially coaxially with the beam axis of the high-energy beam.

A further aspect of the invention also relates to methods for monitoring, in particular for regulating, a cutting process on a workpiece. The methods are characterized by forming an observation beam for observing the interaction region from an observation direction extending at an angle to the beam axis of the high-energy beam and generating an image of the interaction region from the observation direction extending at the angle to the beam axis of the high-energy beam. The methods make it possible to realize the advantages described above in the context of the device.

It is understood that the embodiments described above in the context of the devices also can be realized as corresponding variants of the methods.

A further aspect of the invention relates to methods characterized by: determining a cutting front angle of the kerf and/or an overshoot and/or undershoot of a predetermined cutting front angle of the kerf as characteristic variable(s) of the cutting process and regulating the cutting front angle to a predetermined constant value by influencing at least one manipulated parameter of the cutting process.

In some implementations, the manipulated parameter for regulating the cutting front angle is selected in a manner dependent on a contour to be cut into the workpiece, in particular in a manner dependent on a radius of curvature of a contour to be cut into the workpiece. As described above, it is advantageous to select a suitable manipulated parameter in a manner dependent on the contour to be cut to optimize the process capability or the productivity.

In other implementations, the advance speed between the high-energy beam and the workpiece is influenced as a manipulated parameter for regulating the cutting front angle if the advance speed is restricted to a maximum value by the material and the thickness of the workpiece. In this case, it is advantageous if the power of the high-energy beam is kept at a constant, in particular maximum value while influencing the advance speed, which maximum value in particular can correspond to the maximum power generable by a radiation source that generates the high-energy beam.

In further implementations, the power of the high-energy beam is influenced as a manipulated parameter for regulating the cutting front angle if the advance speed between the high-energy beam and the workpiece is restricted to a maximum value by the geometry of a contour to be cut into the workpiece. In this case, it is advantageous if the advance speed is kept at the maximum value while influencing the power of the high-energy beam.

In some implementations, in particular when cutting contours with very small radii of curvature, the power of the high-energy beam is modulated and the modulation of the power of the high-energy beam is influenced as a manipulated parameter for regulating the cutting front angle.

In further embodiments, the predetermined constant value, to which the cutting front angle is regulated, lies between 2° and 6°, preferably between 3° and 5°. These values for the setpoint value of the cutting front angle were found to be advantageous in most materials to be cut, wherein material thicknesses between approximately 3 mm and approximately 25 mm were used. The method described here for regulating the cutting process can be used both for flame-cutting processes and for fusion cutting processes.

In another aspect, the invention also relates to computer program products configured to carry out all steps of the methods described herein when the computer programs are executed on a data processing facility. By way of example, the data processing facility can be an open-loop and closed-loop control apparatus and/or an control apparatus that is housed in a device as described above, but also an external apparatus that is typically part of a processing machine.

Further advantages of the invention emerge from the description and the drawings. Likewise, the features mentioned above and the features yet to be listed below can find use either on their own in each case or together in any combination. The shown and described embodiments should not be understood to be an exhaustive list but rather to have an exemplary character for explaining the invention.

DESCRIPTION OF DRAWINGS

FIG. 1A shows a schematic illustration of an exemplary embodiment of a device for monitoring and regulating a laser cutting process on a workpiece.

FIG. 1B shows an illustration of a stop for forming an observation beam in such a device along a cut line B-B in FIG. 1A.

FIGS. 2A, 2B, 2C and 2D show four illustrations of thermal images of an interaction region between the laser beam and workpiece from four different, mutually perpendicular observation directions.

FIG. 3 shows an illustration analogous to FIG. 1A with a grid arrangement for generating images of the interaction region from different observation directions.

FIG. 3A shows an illustration of a circular contour cut into the workpiece.

FIGS. 4A, 4B and 4C show detailed illustrations of the grid arrangement from FIG. 3.

DETAILED DESCRIPTION

Figure 5A:
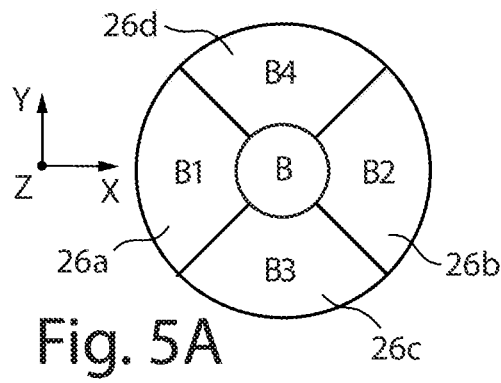
FIGS. 5A and 5B show illustrations of imaging optics for the device from FIG. 1A with a deflection prism for generating images of the interaction region from different observation directions.

FIG. 1A shows an exemplary setup of a device 1 for monitoring and regulating a laser cutting process on a workpiece 3 by means of a laser beam 2. The device 1 is embodied in the form of a laser processing head that is part of a laser processing machine not depicted in any more detail. In the shown example, the laser beam 2 is generated by a $CO_2$ laser. Alternatively, the laser beam 2 can be generated by e.g. a solid-state laser. For the purposes of carrying out cutting-type processing on the workpiece 3, the laser beam 2 is focused onto the workpiece 3 by means of a focusing element in the form of a focusing lens 4. In the shown example, the focusing lens 4 is a lens made from zinc selenide, which focuses the laser beam 2 through a laser processing nozzle 5, more precisely through a nozzle opening 5a of the laser processing nozzle 5 and onto the workpiece 3, namely to a focus position F on the upper side of the workpiece 3 in the shown example. There, the laser beam 2 forms an interaction region 18 with the workpiece 3, behind which a kerf 16 is generated against an advance direction v or cut direction of the laser cutting process. In the case of a laser beam 2 made from a solid-state laser, use can be made of a focusing lens made of e.g. quartz glass.

A deflection mirror 6 embodied in a partly transmissive manner, which reflects the incident laser beam 2 (e.g. with a wavelength of approximately 10.6 µm) and transmits observation radiation, which is relevant for process monitoring, to a further partly transmissive deflection mirror 8, can likewise be identified in FIG. 1A. The deflection mirror 6 is embodied in a partly transmissive manner for observation radiation in the form of thermal radiation at wavelengths from approximately 800 nm to 1100 nm, possibly above 1100 nm. The further partly transmissive deflection mirror 8 reflects the observation radiation to an image capture apparatus 9. An illumination source 10 serves for coaxial illumination of the workpiece 3 with illumination radiation 11. The illumination radiation 11 is transmitted by the further partly transmissive deflection mirror 8 and the deflection mirror 6 and guided through the nozzle opening 5a of the laser processing nozzle 5 to the workpiece 3.

As an alternative to the partly transmissive deflection mirrors 6, 8, use can also be made of scraper mirrors or perforated mirrors, which only reflect incident radiation from an edge region, in order to guide the observation radiation 7 to the image capture apparatus 9 or in order to guide the illumination radiation 11 to the workpiece 3. To enable the observation, it is also possible to use at least one mirror introduced laterally into the beam path of the laser beam 2.

Diode lasers, LEDs or flash lamps, which can be arranged coaxially, as shown in FIG. 1A, but which can also be off-axis in relation to the laser beam axis 13, can be provided as an illumination source 10. By way of example, the illumination source 10 can also be arranged outside of (in particular next to) the device 1 and directed to the workpiece 3; alternatively, the illumination source 10 can be arranged within the device 1, but not be aligned coaxially with the laser beam 2 onto the workpiece 3. Optionally, the device 1 can also be operated without an illumination source 10.

A camera 12 with a high geometric resolution arranged downstream of the further partly transmissive deflection mirror 8 in the observation beam path 7 is part of the image capture apparatus 9. The camera 12 can be a high-speed camera that is arranged coaxially with the laser beam axis 13 or with the extension of the laser beam axis 13 and hence it is arranged in a directionally independent manner. In the depicted example, images are recorded by the camera 12 in the NIR/IR wavelength range using the reflected light method in order to record the process auto-luminescence or a thermal image of the cutting process. In the example shown in FIG. 1A, a filter can be arranged in front of the camera 12 if further radiation or wavelength portions are intended to be excluded from the registration by the camera 12. By way of example, the filter can be embodied as a narrowband bandpass filter with a full width at half maximum of e.g. approximately 15 nm.

The image capture apparatus 9 has imaging optics 14 for generating images B1 to B4 of a region 15 of the workpiece 3 to be monitored, shown in FIGS. 2A, 2B, 2C and 2D and containing the interaction region 18, on a detector surface 12a of the camera 12. In the shown example, the imaging optics 14 have a stop 25 that is rotatably mounted about a central axis of rotation D such that the position of an eccentrically arranged aperture 25a moves along a circular arc around the axis of rotation D in the case of the rotation. The stop 25 can be a mechanically adjustable stop.

By arranging the stop 25 in the beam path of the imaging optics 14, focused by means of a lens 17, only part of the observation beam path 7, which passes through an edge region of the focusing lens 4 and is aligned at an angle β with respect to the beam axis 13 of the laser beam 2 in the convergent beam path after the focusing lens 4, passes through the aperture 25a, which is arranged eccentrically in relation to the extension of the beam axis 13 of the laser beam 2, and forms an observation beam 7a that is imaged on the detector surface 12a. In the example shown in FIG. 1A, an observation direction R1 of the observation beam 7a extends against the advance direction v, along which the laser beam 2 and the workpiece 3 are moved relative to one another in the XY-plane to form the desired cut contour, in the projection into the XY-plane or workpiece plane.

It is understood that an electrically adjustable stop, for example in the form of an LCD array, in which individual pixels or pixel groups are switched on and off electronically in order to generate the stop effect, can also be used in place of the mechanically adjustable stop 25. Also, unlike what is shown in FIGS. 1A and 1B, the mechanical stop 25 can be moved or displaced across the observation beam path 7, for example in the YZ-plane, to shadow different parts of the observation beam path 7 or in order to open the latter for the observation. The stop 25 can also be implemented in the form of one or more mechanical elements that can be folded open and shut.

As is possible to identify in FIGS. 2A, 2B, 2C and 2D, an image of the region 15 of the workpiece 3 to be monitored, recorded by the imaging optics 14 in each case, is delimited by a circular inner contour 5b of the laser cutting nozzle 5. The region 15 to be monitored and delimited by the inner contour 5b of the laser cutting nozzle 5 contains an image B1 to B4 of the interaction region 18 that, in the case of the illustrations shown in FIGS. 2A, 2B, 2C and 2D, was recorded from differently oriented observation directions R1 to R4.

FIG. 2A shows an image B1 of the interaction region 18, which was recorded from the observation direction R1 shown in FIG. 1A. The projection of the observation direction R1 into the XY-plane is depicted by an arrow in FIG. 2A. As was described further above, the observation direction R1 in the example shown in FIG. 1A extends counter to the advance direction v, i.e. in the negative X-direction, which is referred to as a dragging observation in relation to a cutting front 16a on the workpiece 3, behind which the kerf 16 is formed. A cutting front angle α of the cutting front 16a is defined as the angle that a connecting line between the upper edge of the cutting front 16a at the upper side of the workpiece 3 and the lower edge of the cutting front 16a at the lower side of the workpiece 3 includes with the beam axis 13 of the laser beam 2 or with the direction of the thickness of the plate-shaped workpiece 3.

In the case of the dragging observation, there is a cutting front angle α that, if undershot, causes the cutting front 16a and hence also the thermal radiation emanating therefrom to be completely covered by the edge of the cutting front 16a at the upper side of the workpiece 3, and so the kerf 16 or the image B1 associated with the interaction region 18 appears dark. If the inclination of the cutting front 16a flattens and the cutting front angle α becomes bigger, there is no longer a complete cover of the cutting front 16a by the upper edge thereof, and so the length of the cutting front 16a visible under dragging observation becomes greater and the kerf 16 appears bright in regions or bright overall.

It is possible to draw conclusions about the cutting front angle α as a characteristic variable of the cutting process from a brightness or an intensity value I1, which is determined from the image B1 of the interaction region 18 recorded during the dragging observation. The measured overall intensity of the image B1 can serve as intensity value I1; however, the intensity value I1 can also be determined on the basis of a spatially restricted region of the image B1 that, for example, contains the cutting front 16a. The intensity value I1 is also determined in the latter case by virtue of the overall intensity being determined in the spatially restricted region or image portion.

If the intensity value I1 determined on the basis of the recorded image B1 increases, there typically also is an increase in the cutting front angle α. The cutting front angle α can be determined from the intensity value I1 determined under dragging observation on the basis of an association of measured values of the intensity value I1 with cutting front angles α, which, for example, was determined in preceding test measurements. To increase the accuracy, it can be advantageous to relate the intensity value I1 determined on the basis of a spatially restricted portion or image portion to a further intensity value I2 that is determined on the basis of a further spatially restricted portion or image portion of the recorded image B1, which does not contain the cutting front 16a.

However, it is generally not necessary to know the exact value of the cutting front angle α for open-loop and/or closed-loop control of the cutting process. Rather, it can be sufficient to deduce that a critical value of the cutting front angle $α_G$, above which a good cut is no longer present (cf. the description below in conjunction with FIGS. 6A, 6B, 6C and 6D), is overshot by comparing the intensity value I1, or a variable formed from the intensity value I1 and the further intensity value I2, with a threshold $I_S$, in the case of which a good cut can be assumed to be present.

For the dragging observation, it was found to be advantageous if the angle β of the observation direction R1 with respect to the beam axis 13 of the laser beam 2 substantially corresponds to the predetermined cutting front angle $α_G$ at which a good cut is still present. In particular, it is advantageous if the deviation is less than 5°, in particular less than 2°. The value range in which the deviation lies depends on, inter alia, the angle range under which observations are carried out (e.g. the size of the eccentric aperture 25a), and so the deviation may optionally also be larger.

For a predetermined cutting front angle $α_G$ of 8°, the angle β of the observation direction R1 with respect to the beam axis 13 should lie between 3° and 13°, preferably between 6° and 10°. Suitable angles β of the observation direction R1 with respect to the beam axis 13 of the laser beam 2 typically lie between approximately 5° and approximately 15°, in particular between 5° and 10°, wherein the exact value is dependent on the thickness of the workpiece 3 and the used workpiece material. The angle β of the observation direction R1 with respect to the beam axis 13 of the laser beam 2, under which the image B1 is recorded, is predetermined by the distance between the central axis of rotation D and the aperture 25a of the stop 25. The distance, and hence the angle β of the observation direction R1 with respect to the beam axis 13 of the laser beam 2, can optionally be set or modified by a displacement of the stop 25 in the YZ-plane. For the observation under large angles β of e.g. 6° or 10° or more, it is possible, when necessary, to enlarge the diameter of the focusing lens 4 or it is possible for there to be an observation from outside of the focusing lens 4, i.e., the observation beam path 7 does not, or only partly, extend through the focusing lens 4. An observation under smaller angles β (generally at least 2°) is also possible.

The accuracy when determining the cutting front angle α can be increased if the latter is related to an intensity value I2 of a further image B2 of the interaction region 18, which is recorded from a further observation direction R2. In the example shown in FIG. 2B, the further observation direction R2 is oriented at an angle of 180° in the XY-plane in relation to the (first) observation direction R1, i.e., the further observation direction R2 (in the projection into the XY-plane) extends in the advance direction (positive X-direction), which is also referred to as a pushing observation. To simplify a comparison between the intensity values I1, I2, which were recorded from the two different observation directions R1, R2, the angle β, which the two observation directions R1, R2 have with respect to the beam axis 13, is identical (cf. also FIG. 3 in this respect); however, it is also possible, where necessary, to select different angles for the different observation directions.

The intensity value I2, determined from the image B2 in FIG. 2B and recorded under pushing observation, serves as a reference value and it can be, for example, subtracted from the intensity value I1 of the image B1, which is shown in FIG. 2A, recorded under dragging observation. The difference obtained thus or, optionally, a quotient I1/I2 formed from the intensity values I1, I2 can be compared with the threshold or reference value $I_{ref}$ in the control apparatus 19 in order to determine whether the cutting front angle α exceeds a predetermined cutting front angle $α_R$, at which a good cut still is present. For the purposes of the comparison, use is typically made of intensity values I1, I2, which correspond to the overall intensity of the two images B1, B2 or the overall intensity of portions of the two images B1, B2 positioned at the same location. The control apparatus 19 includes a computing unit or computer processing system coupled with or including non-transitory computer readable medium encoding instructions that cause the computing unit to modify the alignment of the observation direction in a projection into a plane perpendicular to the beam axis in a manner dependent on an advance direction of the cutting process.

In addition or as an alternative to the observation directions R1, R2 shown in FIGS. 2A and 2B, which extend with or counter to the advance direction v, it is also possible to undertake an observation of the interaction region 18 from observation directions that do not lie in the plane of the drawing (XZ-plane) of FIG. 1A, which extends along the central plane of the kerf 16. All directions that (at a given angle β) lie on a conical surface emanating from the focal point F constitute possible observation directions. Since the alignment or the orientation of the eccentric aperture 25a sets the observation direction, the selection of a suitable observation direction can be carried out by rotating the stop 25.

Two images B3, B4 of the interaction region 18, which were recorded from a third observation direction R3 at −90° with respect to the X-direction (i.e. in the negative Y-direction) or from a fourth observation direction R4 at +90° with respect to the X-direction (i.e. in the positive Y-direction), are depicted in FIGS. 2C and 2D. With the aid of the images B3, B4 recorded from these two observation directions R3, R4, it is possible to observe the two lateral edges (not depicted in FIG. 1A) of the kerf 16 in more detail.

On the basis of the recorded images B3, B4, which extend in the XY-plane at an angle of +/−90° in relation to the advance direction v, the control apparatus 19 can determine a burr formation, roughness and/or furrow formation as characteristic variable(s) of the kerf 16. By way of example, image B3, which was recorded from the third observation direction R3, can be used to determine a furrow formation or a furrow spacing in the cutting or advance direction v and a furrow depth on that lateral edge of the kerf 16 that is arranged in front of the plane of the drawing in FIG. 1A.

Accordingly, image B4, which was recorded from the fourth observation direction R4, can also be used to determine a furrow formation or a furrow spacing and a furrow depth on that lateral edge of the kerf 16 that is arranged behind the plane of the drawing in FIG. 1A. By way of example, the furrows can be identifiable in the form of periodically recurring structures (typically in the form of elevations and depressions) at the edge of the image B3, B4 of the interaction region 18 and a furrow spacing can be inferred from the distance between the structures and the furrow depth can be inferred from the amplitude of the structures.

The control apparatus 19 can also determine a burr formation on the lower side of the workpiece 3 and/or the roughness at the two cut gap flanks and edges of the kerf 16 on the basis of the third and fourth images B3, B4. In the case of burr formation, the lower edge of the kerf 16 no longer extends as a horizontal line, and so a geometric deviation that can be detected by the control apparatus 19 is created in the respective image B3, B4. It is understood that, for the aforementioned purposes, the third and fourth observation directions R3, R4 need not necessarily extend at right angles to the advance direction v. Rather, there can optionally also be an observation at angles that, for example, extend between approximately +70° and +110° (or −70° and −110°) with respect to the advance direction in the XY-plane.

To be able to observe a specific characteristic variable, for example the cutting front angle α, from a desired observation direction, for example the observation direction R1 counter to the advance direction v, even in the case of a change in the advance direction v when cutting along curved cut contours, the alignment of the observation direction R1 in the XY-plane should be modified in a manner dependent on the advance direction v or on the orientation of the advance direction v in the XY-plane. An open-loop and closed-loop control apparatus 20 can serve to this end; it accordingly co-rotates the stop 25 and hence the aperture 25a about the axis of rotation D in the case of a change in the advance direction v such that the observation direction R1 always remains aligned counter to the advance direction v. By co-rotating the stop 25, it is also possible to keep the alignment of each one of the further observation directions R2 to R4, shown in FIGS. 2B, 2C and 2D, constant relative to the advance direction v.

Since the open-loop and closed-loop control apparatus 20 controls the cutting process, the closed loop apparatus contains information in respect of the current advance direction v and it can actuate the image capture apparatus 9, more precisely the stop 25, in a suitable manner. Optionally, the stop 25 also can have more than one aperture 25a in order to enable a simultaneous observation of the interaction region 18 from different observation directions R1 to R4. In this case, the imaging optics 14 should be configured in such a way that the images B1 to B4, which are associated with the different observation directions R1 to R4, are generated on different portions of the detector surface 12a.

A further possibility for simultaneously generating a plurality of images from different observation directions R1, R2, . . . is explained below on the basis of a device 1 shown in FIG. 3. In contrast to the device 1 shown in FIG. 1A, in which the observation beam 7a is generated by a non-centric aperture (aperture 25a) in the observation beam path 7 and the observation beam path 7 is imaged by means of a single imaging lens 17, which is central in relation to the beam axis 13 of the laser beam 2, the device 1 shown in FIG. 3 has imaging optics 14 with a plurality of optical elements in the form of lens elements 22, 23, which serve to generate a plurality of images, respectively recorded from different observation directions R1, R2, . . . , on the detector surface 12a of the detector 12.

In the detail of the imaging optics 14 shown in FIGS. 4A, 4B and 4C, these have a plurality of six first cylindrical lenses 22 and six second cylindrical lenses 23, which are arranged in a grid arrangement 24 (lens array), in order to generate a total of 6×6=36 images on the detector surface 12a. In the example shown in FIG. 3, the imaging optics 14 moreover have two lenses 17a, 17b in a telescopic arrangement to enable an adaptation of the beam cross section of the observation beam path to the detector surface 12a of the camera 12. Alternatively, the imaging of the different observation directions can also be carried out according to the plenoptic principle or by means of a light-field camera. Typically, it is not sensible to evaluate all 36 images in parallel. Rather, the evaluation is typically restricted to those images that are particularly well suited to determining a specific characteristic variable.

In this case, the control apparatus 20 controls the control apparatus 19 in a manner dependent on the current advance direction v such that there is only an evaluation of those images that were recorded from observation directions with an advantageous alignment for determining a respective characteristic variable, as will be described in more detail below. If the observation angle β is additionally also intended to be modified, the radial distance between the images evaluated by the control apparatus 19 and the center of the grid arrangement 24 can be suitably selected or modified.

In the grid arrangement 24 shown in FIGS. 4A, 4B and 4C, it is possible, for example, to use two images B1, B2 for determining the cutting front angle α, which images are associated with two observation beams 7a, 7b or two observation directions R1, R2, which are substantially aligned in the advance direction v or counter to the advance direction v, corresponding to the negative and positive X-directions, respectively. As can be gathered from FIG. 4C, the observation directions R1, R2, along which the two images B1, B2 are recorded, deviate by approximately 5° from the X-direction due to the lack of image positions on the camera 12 that, in the Y-direction, extend in a mirror symmetrical manner with respect to the X-axis. Although such an alignment of the observation directions R1, R2 is not ideal, but it likewise enables a dragging and pushing observation and it is therefore generally sufficient for determining the cutting front angle α with sufficient accuracy.

It is understood that, depending on the desired resolution, it is also possible to provide fewer or more cylindrical lenses in the grid arrangement 24 and that it is also possible to use spherical or optionally aspherical lenses for forming the grid arrangement 24 instead of crossed cylindrical lenses 22, 23. Four imaging optical elements can form the grid arrangement 24 in the simplest case. It is understood that a single optical element arranged eccentrically in relation to the extension of the beam axis 13 of the laser beam 2 is also sufficient for recording an image of the interaction region 18 from an observation direction extending at an angle β with respect to the beam axis 13 of the laser beam 2. Optionally, the grid arrangement 24 can be restricted to a ring-shaped region, i.e. it is possible to dispense with the grid elements in the center of the grid arrangement 24 as these can only be used to generate images that have a very small angle with respect to the beam axis 13 of the laser beam 2. Optionally, a comparatively large lens can be arranged centrally in the central region of the grid arrangement 24 in order to enable a coaxial observation of the interaction region 18 with a high resolution.

Figure 5B:
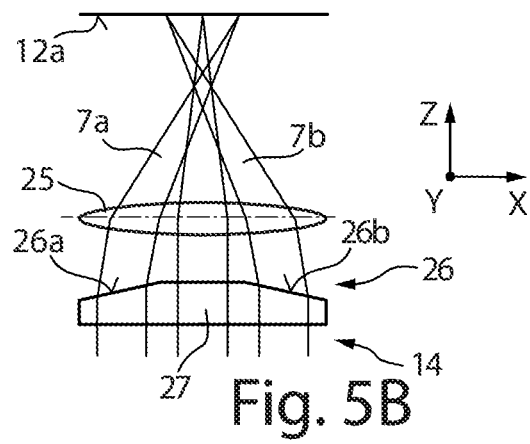

An alternative embodiment of the imaging optics 14 with an imaging lens 25 and an apparatus for influencing the beam direction of the observation beam path 7 in the form of a beam deflection apparatus embodied as a deflection prism 26 is depicted in FIGS. 5A and 5B. The deflection prism 26 has four wedge-shaped portions with planar areas 26a-d which are arranged at an angle to the observation radiation or to the beam axis thereof and which are arranged around a central planar region 27. The first two areas 26a, b serve as beam deflection regions for deflecting the incident observation radiation in the X-direction such that it is not incident perpendicular to the central plane of the imaging lens 25 on the latter, as a result of which a first and second observation beam 7a, 7b are formed for generating on the detector surface 12a a first and second image B1, B2, which are spaced apart from one another along the X-axis.

The third area 26c and the fourth area 26d serve correspondingly as beam deflection regions for generating on the detector surface 12a a third and fourth image B3, B4, which are spaced apart from one another along the Y-direction. The central region 27 not deflecting the observation radiation serves to generate an image B, arranged centrally in the observation beam path 7, on the detector surface 12a that can be used for process monitoring. Overall, an approximately convex geometry of the deflection prism 26 emerges in the exemplary embodiment shown in FIGS. 5A and 5B. It is understood that it is also possible to use a deflection prism with a substantially concave geometry to generate the plurality of images B1 to B4.

The deflection arrangement 26 using four areas 26a-d arranged around the central, planar region 27 and generating a subdivision of the angular region of the observation beam path 7 from 360° into four 90° segments, shown in FIGS. 5A and 5B in an exemplary manner, is typically too approximate to be able to determine the cutting front angle α with sufficient accuracy since the condition that the respectively selected observation direction or the respectively selected observation beam 7a, 7b enables an observation counter to the advance direction v of the cutting process is generally not satisfied. In general, a subdivision of the entire available angular range of 360° into at least eight or into at least sixteen angle segments is necessary in order to determine the cutting front angle α with sufficient accuracy.

Figure 6A:
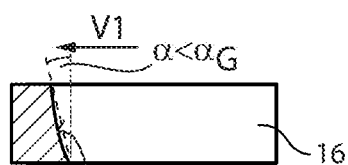
FIGS. 6A, 6B, 6C and 6D show illustrations of a cutting front angle in a kerf formed at different advance speeds during the laser cutting process.
Figure 6B:
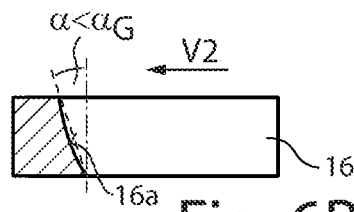
Figure 6C:
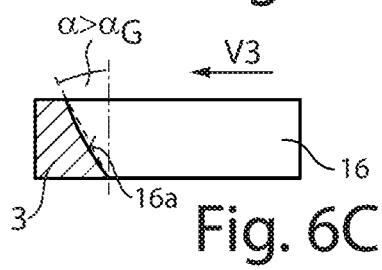
Figure 6D:
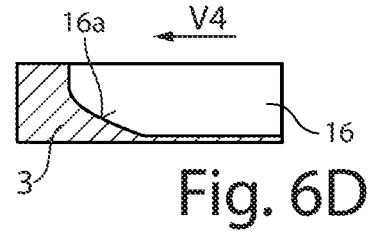

As described further above, the open-loop and closed-loop control apparatus 20 can also serve to intervene into the cutting process and adapt or modify specific cutting parameters, depending on the value of the determined characteristic variable. Below, the influence of the cutting front angle α on the cut quality or on the cutting result is explained in more detail on the basis of FIGS. 6A, 6B, 6C and 6D. FIG. 6A shows a cut or a kerf 16, in which the cutting front angle α of the cutting front 16a lies at approximately 3°, FIG. 6B shows a cutting front 16a with a cutting front angle α of approximately 4.9°. Both cutting front angles α lie below a predetermined cutting front angle $\alpha_G=5°$, at which a good cut is just still present. FIG. 6C shows a cutting front 16a with a cutting front angle α of approximately 10°, i.e. the predetermined cutting front angle $\alpha_G=5°$ is significantly overshot, leading to whisker formation at the kerf 16. FIG. 6D finally shows a cutting front 16a in which a loss of cut is present, in which the lower edge of the workpiece 3 is no longer severed. It is understood that in the loss of cut shown in FIG. 6D, a meaningful determination of the cutting front angle α is no longer possible.

To prevent the loss of cut depicted in FIG. 6D, the open-loop and closed-loop control apparatus 20 sets the advance speed v of the cutting process to a suitable value depending on the current cutting front angle α determined by the control apparatus 19. In so doing, the predetermined cutting front angle $\alpha_G$ is associated with an advance speed v that—quite arbitrarily—is set to be 100%, i.e. this is the maximum advance speed at which, in general, a good cut is still possible. The advance speeds v1 to v4 depicted in FIGS. 6A, 6B, 6C and 6D correspond to 50% (FIG. 6A), approximately 100% (FIG. 6B), 110% (FIG. 6C) and 120% or more (FIG. 6D) of this maximum advance speed $v_{max}$.

The maximum advance speed $v_{max}$ is a guide value that is associated with a specific processing task. The advance speed v can be set or regulated in a suitable manner on the basis of the cutting front angle α in order to achieve the cutting front angle α remaining below the predetermined cutting front angle $\alpha_G$. In particular, the advance speed v can also be reduced to a value below the maximum advance speed $v_{max}$ when necessary, in order to prevent an overshoot of the predetermined (maximum) cutting front angle $\alpha_G$.

The open-loop and closed-loop control apparatus 20 can also serve to control or regulate further parameters of the cutting process, for example the laser power, the gas flow, etc. in a manner dependent on the determined cutting front angle $\alpha$ or on further variables of the cutting process, for example the burr formation, roughness and/or furrow formation at the kerf 16.

In conclusion, the cutting front angle $\alpha$ and/or further characteristic variables of the cutting process can be determined in the manner described above. In particular, the cutting front angle $\alpha$ can also be determined in the case where the cutting front lower edge is situated outside of the visual range 15 that is delimited by the nozzle opening 5a of the laser cutting nozzle 5. Moreover, the cutting front angle can be determined reliably in terms of simple image processing and the components required for determining characteristic variables can be integrated into the processing head that forms the device 1.

With the aid of the device 1 described above, or with the aid of another suitable device that renders possible the determination of an overshoot and/or undershoot of a predetermined cutting front angle $\alpha_G$ or the direct (absolute) determination of the cutting front angle $\alpha$, it is possible to regulate the cutting front angle $\alpha$ to a constant setpoint value $\alpha_G$ that, in the example described here, corresponds to the cutting front angle $\alpha_G$, the overshoot and/or undershoot of which is determined by the control apparatus 19. For the purposes of regulating the cutting front angle $\alpha$ to the setpoint value $\alpha_G$, the closed-loop control apparatus 20 influences at least one manipulated parameter as a manipulated variable for the closed-loop control, as will be explained below on the basis of FIG. 7 using the example of a straight-line contour 30, that is cut into a workpiece 3.

Figure 7:
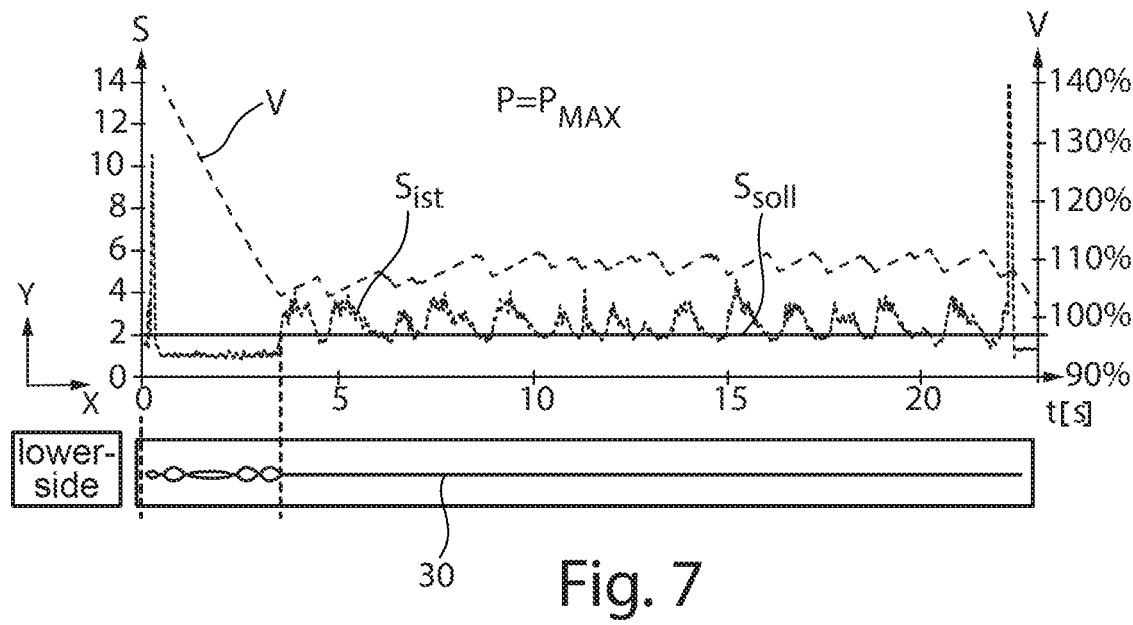
FIG. 7 shows an illustration of a closed-loop control of the cutting front angle to a constant setpoint value using a two-state control.

Shown over the workpiece 3, depicted toward the bottom of FIG. 7, is a speed profile of the advance speed v as a function of time t. The scaling of the time axis is selected in such a way that a respective time corresponds to the location of the workpiece 3 along the X-axis depicted immediately therebelow. At the start of the cutting process, the advance speed v is very large, i.e. the advance speed v, at approximately 140%, lies significantly above the maximum advance speed $v_{MAX}$ that, as was explained above, constitutes a guide value for a specific processing task that is characterized by the thickness D of the workpiece 3 and the material or the material type of the workpiece 3.

As a result of the advance speed v that is too high at the outset, a setpoint value $S_{Soll}$ of the incline S of the cutting front 16a is undershot, which corresponds in the shown example to a setpoint value $\alpha_G$ for the cutting front angle $\alpha$ that lies at $\alpha_G=4°$. Typical setpoint values $\alpha_G$ for the cutting front angle $\alpha$ lie between approximately 2° and approximately 6°, in particular between approximately 3° and approximately 5°. Since the setpoint value $\alpha_G$ of the cutting front angle $\alpha$ is overshot (or since the setpoint value $S_{Soll}$ of the cutting front incline S is undershot), there is a loss of cut, i.e. the workpiece 3 is not completely cut through by the laser beam 2, as can easily be identified on the basis of the lower side of the workpiece 3 shown in FIG. 7.

The control apparatus 19 identifies that the setpoint value $\alpha_G$ of the cutting front angle $\alpha$ is overshot in the manner described further above. To keep the current inclination $S_{Ist}$ of the cutting front 16a at the setpoint value $S_{Soll}$ (and therefore also keep the actual value of the cutting front angle $\alpha$ at the setpoint value $\alpha_G$), the closed-loop control apparatus 20 has a discontinuous-action controller, a two-position controller 31 in the shown example (cf. FIG. 1A and FIG. 3). The two-position controller 31 increases or reduces the advance speed v depending on whether the actual value $S_{Ist}$ of the inclination of the cutting front 16a lies above the setpoint value $S_{Soll}$ or below the setpoint value $S_{Soll}$. Accordingly, the advance speed v is increased or reduced, depending on whether the actual value of the cutting front angle $\alpha$ lies under or over the setpoint value $\alpha_G$. Instead of the two-position controller 31, it is also possible for other discontinuous-action controllers, e.g. three-position controllers or the like, to be integrated into the closed-loop control apparatus 20 for undertaking the closed-loop control of the cutting front angle $\alpha$ to the setpoint value $\alpha_G$.

During the closed-loop control of the advance speed v described in the context of FIG. 7, the power P of the laser beam 2 is kept at a constant, maximum value $P_{MAX}$ (cf. FIG. 1A), which represents a guide value for the respective processing task, i.e. for the material of the workpiece 3 and the thickness D of the workpiece 3 and the employed laser source. In the case of conventional materials such as e.g. steels, the maximum possible power $P_{MAX}$ of the laser source is generally selected. The maximum power $P_{MAX}$ is typically reached if the contour to be cut, as shown in FIG. 7, is a comparatively long, straight-lined contour 30 (with an infinite radius of curvature).

It was found to be advantageous to use different manipulated parameters for regulating the cutting front angle $\alpha$, depending on the contour to be cut into the workpiece 3. By way of example, the advance speed v can be used as a manipulated variable if the power of the high-energy beam reaches the maximum value $P_{MAX}$ thereof, which is typically the case when cutting relatively long, straight contours (with an infinite radius of curvature) (see above).

If the contour to be cut is a comparatively small contour 34, as depicted in FIG. 3A, which contour has a radius of curvature R that is so small that the maximum advance speed $v_{MAX}$ is restricted by the dynamics of the movement axes involved in the movement between the laser beam 2 and the workpiece 3, with the maximum axial acceleration thereof being of the order of approximately 1 g. To cut a small contour 34, use can be made of in particular one or optionally more additional axe(s), i.e. redundant, highly dynamic axes with a small movement or displacement range. In the example shown in FIG. 3A, the power P of the laser source 33 of the device 1 is used as a manipulated variable for regulating the cutting front angle $\alpha$. In this case, the closed-loop control can be carried out in a manner analogous to the example described in the context of FIG. 7. Here, the advance speed v is typically kept at the maximum possible value $v_{MAX}$ that may vary depending on the movement along the contour 34 to be cut, in particular depending on the possibly non-constant radius of curvature R.

When cutting very small contours 34, it may be advantageous to modulate the power P of the laser beam 2 generated by the laser source 33 instead of using continuous wave operation. In particular, the laser source 33 can be switched over into a pulsed operation in this case. In this case, the modulation or pulse frequency $f_M$ of the laser beam 2 can be used as a manipulated parameter for regulating the cutting front angle $\alpha$. Alternatively or additionally, it is optionally possible to use the pulse duration of the pulses of the pulsed laser beam 2 generated by the laser source 33 as a manipulated parameter for regulating the cutting front angle $\alpha$.

Instead of determining the overshoot of a predetermined cutting front angle $\alpha_G$, as described further above in the context of FIG. 7, it is also possible to determine the absolute value of the cutting front angle $\alpha$. By way of example, this can be carried out in the manner described in WO 2012/107331 A1, cited in the introduction, i.e., by virtue of the distance A between the cutting front upper edge and the cutting front lower edge of the cutting front 16a being measured along the gap center depicted by dashed line in FIG. 3A in the image, shown in FIG. 3A, of the surface of the workpiece 3 delimited by the circular inner contour 5b. The cutting front angle $\alpha$ emerges from the measured distance A and the thickness D of the workpiece 3 in accordance with the formula $\alpha=\arctan(A/D)$.

If the absolute value of the cutting front angle $\alpha$ is known, it was found to be advantageous to use a continuous-action controller 32, for example a PID controller, in the closed-loop control apparatus 20 instead of a discontinuous-action controller 31. It is understood that the device 1 can be embodied both to determine the absolute value of the cutting front angle $\alpha$ and to determine the overshoot of the predetermined cutting front angle $\alpha_G$. The selection of determination method or closed-loop control method can depend, for example, on whether the cutting front 16a is easily identifiable during the cutting process or whether it is only identifiable with difficulties as a result of the process auto-luminescence so that the distance A cannot be determined exactly enough.

In conclusion, the productivity and the process capability of the cutting process can be optimized by regulating the cutting front angle $\alpha$ to a constant setpoint value $\alpha_G$ described here. In particular, this may possibly realize an "autonomous" cutting process, in which the device 1 independently sets the ideal work point for different materials or contours to be cut.

Implementations of the subject matter and the operations described in this specification can be implemented by digital electronic circuitry, or via computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a control apparatus or a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A device for monitoring a cutting process on a workpiece comprising:
    a focusing element for focusing a high-energy beam onto the workpiece;
    an image capture apparatus for capturing a region at the workpiece to be monitored, the region comprising an interaction region of the high-energy beam with the workpiece,
    wherein the image capture apparatus forms an observation beam for observing the interaction region from an observation direction extending at an angle to a beam axis of the high-energy beam in a convergent beam path between the focusing element and the workpiece, and wherein the image capture apparatus comprises an imaging optic system configured to generate an image of the interaction region from along the observation beam, wherein the image capture apparatus has a stop for modifying an alignment of the observation direction of the observation beam; and
    a control apparatus configured to modify the alignment of the observation direction in a projection into a plane perpendicular to the beam axis in a manner dependent on an advance direction of the cutting process.

2. The device of claim 1, wherein the high-energy beam is a laser beam.

3. The device of claim 1, wherein the image capture apparatus is configured to modify the alignment of the observation direction of the observation beam in a plane perpendicular to the beam axis of the high-energy beam.

4. The device of claim 3, wherein the image capture apparatus has a stop for modifying the alignment of the observation direction of the observation beam.

5. The device of claim 1, wherein the imaging optic system is configured to generate a plurality of images of the interaction region from differently aligned observation directions.

6. The device of claim 5, wherein the imaging optic system has a plurality of imaging optical elements for generating the plurality of images.

7. The device of claim 6, wherein the plurality of imaging optical elements form a grid arrangement.

8. The device of claim 5, wherein, for the purposes of generating the plurality of images, the imaging optic system has an apparatus configured to form a respective observation beam by influencing a beam direction of an observation beam path.

9. The device of claim 1, further comprising a control apparatus configured to modify the alignment of the observation direction in a plane perpendicular to the beam axis in a manner dependent on an advance direction of the cutting process.

10. The device of claim 8, wherein the control apparatus is configured to keep the alignment of the observation direction constant relative to the advance direction.

11. The device of claim 1, wherein the observation direction extends counter to an advance direction of the cutting process in a plane perpendicular to the beam axis of the high-energy beam.

12. The device of claim 11, wherein the control apparatus is configured to determine one or more of a cutting front angle of the kerf, an overshoot of a predetermined cutting front angle of the kerf, and an undershoot of the predetermined cutting front angle of the kerf as the at least one characteristic variable of the kerf on the basis of the captured interaction region.

13. The device of claim 11, wherein the angle at which the observation direction extends in relation to the beam axis of the high-energy beam deviates by less than 5° from the predetermined cutting front angle.

14. The device of claim 12, wherein the angle at which the observation direction extends in relation to the beam axis of the high-energy beam deviates by less than 2° from the predetermined cutting front angle.

15. The device of claim 1, wherein the angle from the observation direction to the beam axis of the high-energy beam is in the range of 5°-15°.

16. The device of claim 1, wherein the angle from the observation direction to the beam axis of the high-energy beam is in the range of 5°-10°.

17. The device of claim 1, wherein the image capture apparatus is configured to form a further observation beam for observing the interaction region from a further observation direction and wherein the imaging optic system is configured to generate a further image of the interaction region from the further observation direction.

18. The device of claim 17, wherein the control apparatus is configured to compare a first intensity value determined on the basis of the further image of the interaction region with a second intensity value determined on the basis of another image of the interaction region captured counter to the advance direction in a plane perpendicular to the beam axis of the high-energy beam.

19. The device of claim 5, wherein at least one of the observation directions in a plane perpendicular to the beam axis of the high-energy beam does not extend in, or counter to, the advance direction of the cutting process and wherein the control apparatus is configured to determine at least one of a burr formation, a roughness, and a furrow formation as the at least one characteristic variable of the kerf on the basis of the generated image.

20. The device of claim 1, further comprising an illumination source for illuminating the workpiece in the region to be monitored.

21. The device of claim 1, wherein the image capture apparatus is configured to record the image through a nozzle opening of a laser processing nozzle for the passage of a laser beam to the workpiece.

22. The device of claim 1, wherein the image capture apparatus has a detector with a detector surface, at which the image is generated.

23. The device of claim 1, wherein the image capture apparatus includes a camera, with a detector surface, at which the image is generated.

24. The device of claim 23, further comprising: at least one of an open-loop and a closed-loop control apparatus for controlling parameters of the cutting process in a manner dependent on the at least one determined characteristic variable.

25. The device of claim 1, wherein the control apparatus is configured to determine at least one of a cutting front angle of the kerf, an overshoot of a predetermined cutting front angle, and an undershoot of the predetermined cutting front angle of the kerf as the at least one characteristic variable of the kerf on the basis of the captured interaction region, and wherein the device further comprises a closed-loop control apparatus for regulating the cutting front angle to a predetermined constant value by influencing at least one manipulated parameter of the cutting process.

26. The device of claim 25, in which the closed-loop control apparatus is configured to select the manipulated parameter for regulating the cutting front angle in a manner dependent on a contour to be cut into the workpiece.

27. The device of claim 25, wherein the closed-loop control apparatus is configured to influence the advance speed between the high-energy beam and the workpiece as a manipulated parameter for regulating the cutting front angle if the advance speed is restricted to a maximum value by the material and the thickness of the workpiece.

28. The device of claim 27, wherein the closed-loop control apparatus is configured to keep the power of the high-energy beam at a constant value while influencing the advance speed.

29. The device of claim 25, wherein the closed-loop control apparatus is configured to influence the power of the high-energy beam as a manipulated parameter for regulating the cutting front angle if the advance speed between the high-energy beam and the workpiece is restricted to a maximum value by the geometry of a contour to be cut into the workpiece.

30. The device of claim 29, wherein the closed-loop control apparatus is configured to keep the advance speed at the maximum value while influencing the power of the high-energy beam.

31. The device of claim 29, wherein the closed-loop control apparatus is configured to modulate the power of the high-energy beam and influence the modulation of the power of the high-energy beam as a manipulated parameter for regulating the cutting front angle.

32. The device of claim 25, wherein the control apparatus is configured to determine at least one of an overshoot and an undershoot of the predetermined cutting front angle of the kerf and wherein the closed-loop control apparatus for regulating the cutting front angle has a discontinuous-action controller.

33. The device of claim 32, wherein the discontinuous-action controller includes at least one of a two-position controller and a three-position controller.

34. The device of claim 25, wherein the control apparatus is configured to determine the cutting front angle of the kerf and wherein the closed-loop control apparatus for regulating the cutting front angle has a continuous-action controller, in particular a PID controller.

35. The device of claim 34, wherein the continuous-action controller comprises a PID controller.

* * * * *